United States Patent [19]

Zach

[11] 4,327,781

[45] May 4, 1982

[54] WIRE STORAGE AND WRAPPING TOOL

[75] Inventor: Hubert Zach, Berlin, Fed. Rep. of Germany

[73] Assignee: Micro Electronic Systems, Inc., Danbury, Conn.

[21] Appl. No.: 124,594

[22] Filed: Feb. 25, 1980

[51] Int. Cl.[3] .......................... B21F 15/00; B25F 1/00; H02G 1/12

[52] U.S. Cl. .................................. 140/124; 140/93 R; 242/7.17; 242/7.18

[58] Field of Search ............... 29/750; 140/93 R, 124; 242/7.17, 7.18; 324/51

[56] References Cited

U.S. PATENT DOCUMENTS

| | | | |
|---|---|---|---|
| 302,461 | 7/1884 | Worcester | 242/170 |
| 3,272,455 | 9/1966 | Sternberg et al. | 242/171 |
| 3,318,343 | 5/1967 | Charnosky | 140/124 |
| 3,563,171 | 1/1968 | Sietmann et al. | 324/51 |
| 3,619,884 | 11/1971 | Bennett et al. | 29/760 |
| 3,769,699 | 11/1973 | Bennett et al. | 140/93 R X |
| 3,967,661 | 7/1976 | Scoville et al. | 140/124 |
| 4,177,555 | 12/1979 | Weltman et al. | 140/124 X |
| 4,194,700 | 3/1980 | Kober | 140/124 X |

*Primary Examiner*—Paul A. Bell
*Attorney, Agent, or Firm*—Mattern, Ware, Davis & Stoltz

[57] ABSTRACT

A wire storage and wrapping tool for making wrapped wire connections on wrapping posts incorporates a portable housing having a front end and a rear end, a hollow open-ended sleeve shaft extending through the housing and rotatably mounted therein with its open ends exposed, and a drive motor mounted in the housing and connected to rotate the sleeve shaft. A hollow wrapping bit is removably engaged in the front end of the sleeve shaft with a wrapping post-engaging axial bore and an eccentric axial wire-delivery portal with an insulation-slitting axial edge. A hollow wire storage container encloses an extended length of wire wound in a succession of uniform layers concentric about a central axis, and has a wire exit portal disengageably secured to the rear open end of the sleeve shaft. The storage container's exit portal, the hollow sleeve shaft and the wire delivery portal of the hollow wrapping bit form a continuous wire-conveying passage through the tool, whereby a length of wire unwound from the innermost uniform layer is guided through the sleeve shaft and wire delivery portal past the insulation-slitting edge for wrapping connection on a wrapping post telescoped within the post-engaging axial bore of the wrapping bit. The power driven sleeve shaft carries the wire storage container and the wrapping bit in a simultaneously-rotating unitary assembly, automatically drawing wire from the innermost wire layer, while maintaining dynamic balance of the stored wire.

11 Claims, 9 Drawing Figures

WIRE STORAGE AND WRAPPING TOOL

TECHNICAL FIELD

This invention relates to power-driven wire wrapping tools incorporating a replaceable wire storage container carrying up to six hundred feet or more of wrapping wire. In particular, the invention provides lightweight portable wrapping tools with self-contained wire storage capability, providing many thousands of wire wrapped connections between reloadings.

BACKGROUND ART

This invention is an improvement over the wire wrapping tools disclosed in Scovill and Tipton U.S. Pat. No. 3,967,661 granted July 6, 1976 to Vector Electronic Company of Silmar, California as assignee. That patent discusses in its first two columns a considerable number of United States patents comprising the background for the present invention.

The principal disadvantage of prior art wrapping tools has been the severely limited length of wrapping wire which could be conveniently carried by the tool itself. Small spools of wire mounted on the remote or distal end of the hollow spindle, in which the wire wrapping bit is mounted in the priximal end, have been used in both simple hand-twirled wire wrapping tools and in portable hand-held motor driven wire wrapping tools of the kind manufactured and sold by Vector Electronic Company, Inc. of Silmar, Calif. and by OK Machine and Tool Corporation of 3455 Connors Street, Bronx, N.Y. 10475. These small spools of wire customarily carry no more than fifty feet of standard wrapping wire, requiring frequent reloading and inconvenient juggling of tools by the operator, providing interruptions and serious inefficiency and interfering with the process of installing wrapped wire connections.

Another disadvantage of conventional wire wrapping tools arises from the need for continuity checking of the completed wrapped terminals and their connecting wires. No automatic continuity check capability has been afforded by prior art wrapping tools, necessitating the use of continuity checking probes, meters and the like.

Prior conventional wire wrapping tools have thus failed to provide an efficient wire wrapping device for continuous and uninterrupted use providing easily verified continuity checks of the wrapped connections being installed.

Accordingly a principal object of the present invention is to provide a lightweight portable wire wrapping tool providing self-contained storage for a large quantity of wrapping wire.

A further object of the invention is to provide such wire wrapping tools with an easily interpreted continuity checking visual indicator.

Another object of the invention is to provide such wire wrapping tools in extremely lightweight portable form, capable of wrapping thousands of wire wrapped connections and confirming their reliability while minimizing operator fatigue and downtime for reloading fresh supplies of wire.

Other objects of the invention will in part be obvious and will in part appear hereinafter.

The invention accordingly comprises the features of construction, combinations of elements, and arrangement of parts which will be exemplified in the construction hereinafter set forth, and the scope of the invention will be indicated in the claims.

BRIEF DESCRIPTION OF DRAWINGS

For a fuller understanding of the nature and objects of the invention, reference should be had to the following detailed description taken in connection with the accompanying drawings, in which.

and

Figures 4, 5, 6, 7, 9:
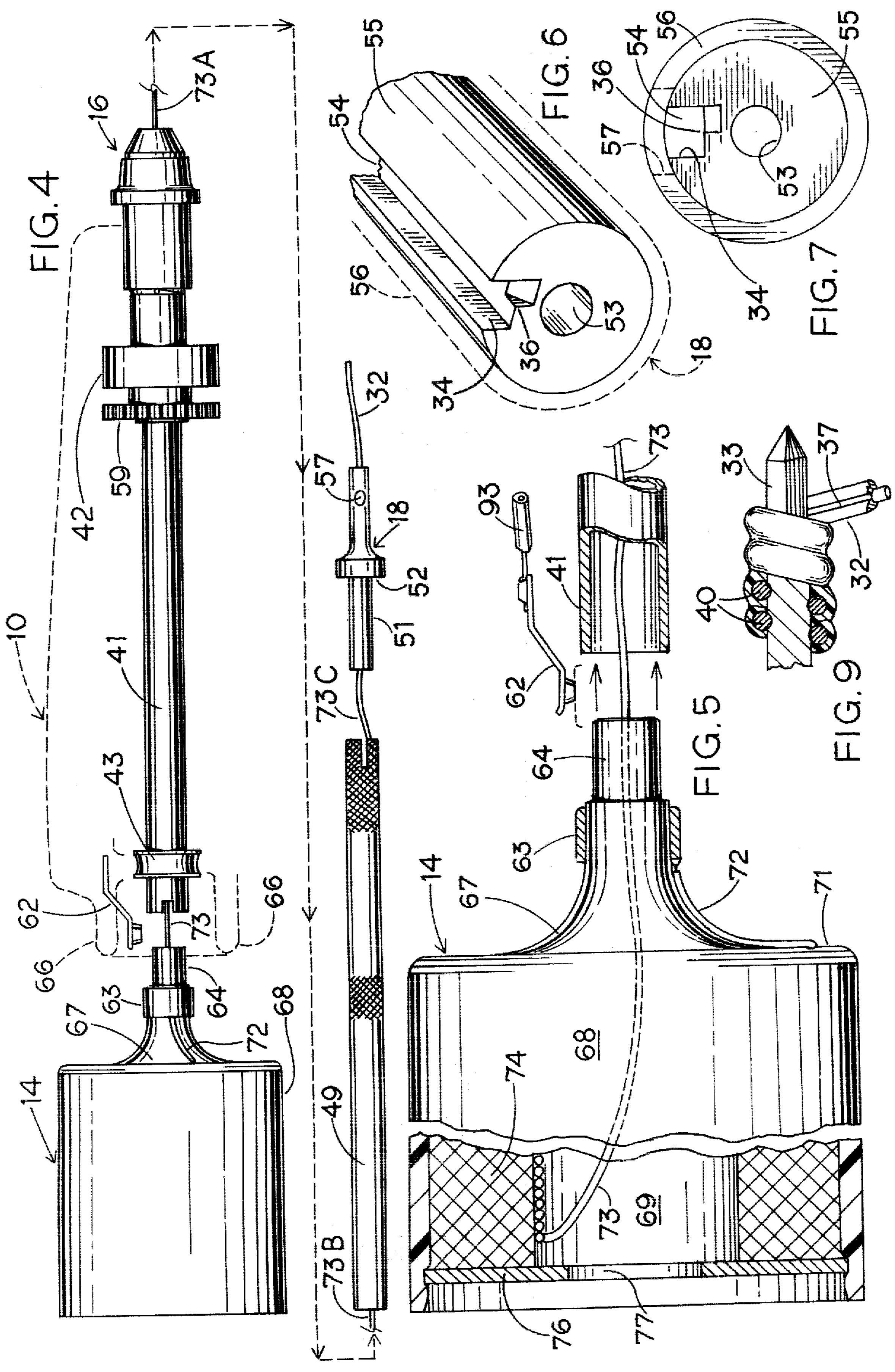
FIG. 4 is an exploded schematic view of the rotating central sleeve shaft and associated parts, disassembled for installing a new wire storage container and threading the wire through the central sleeve and the wrapping bit.
FIG. 5 is an enlarged fragmentary diagrammatic side elevation view, partially in section, of the wire storage container, ready for insertion into the adjacent sleeve shaft of the tool.
FIG. 6 is a greatly enlaged fragmentary perspective view of the wrapping tip of the wrapping bit showing the cutting edge past which the wire is drawn during the wrapping operation to slit its insulation facing the wrapping post and achieve the desired tight swaged contact between the exposed wire and the wrapping post on which it is tightly twisted.
FIG. 7 is a corresponding greatly enlarged end elevation view of the wrapping bit.

FIG. 9 is a greatly enlaged fragmentary diagrammatic view partially in section showing a wrapped connection installed by the tools of the present invention.

BEST MODE FOR CARRYING OUT THE INVENTION

Figure 1:
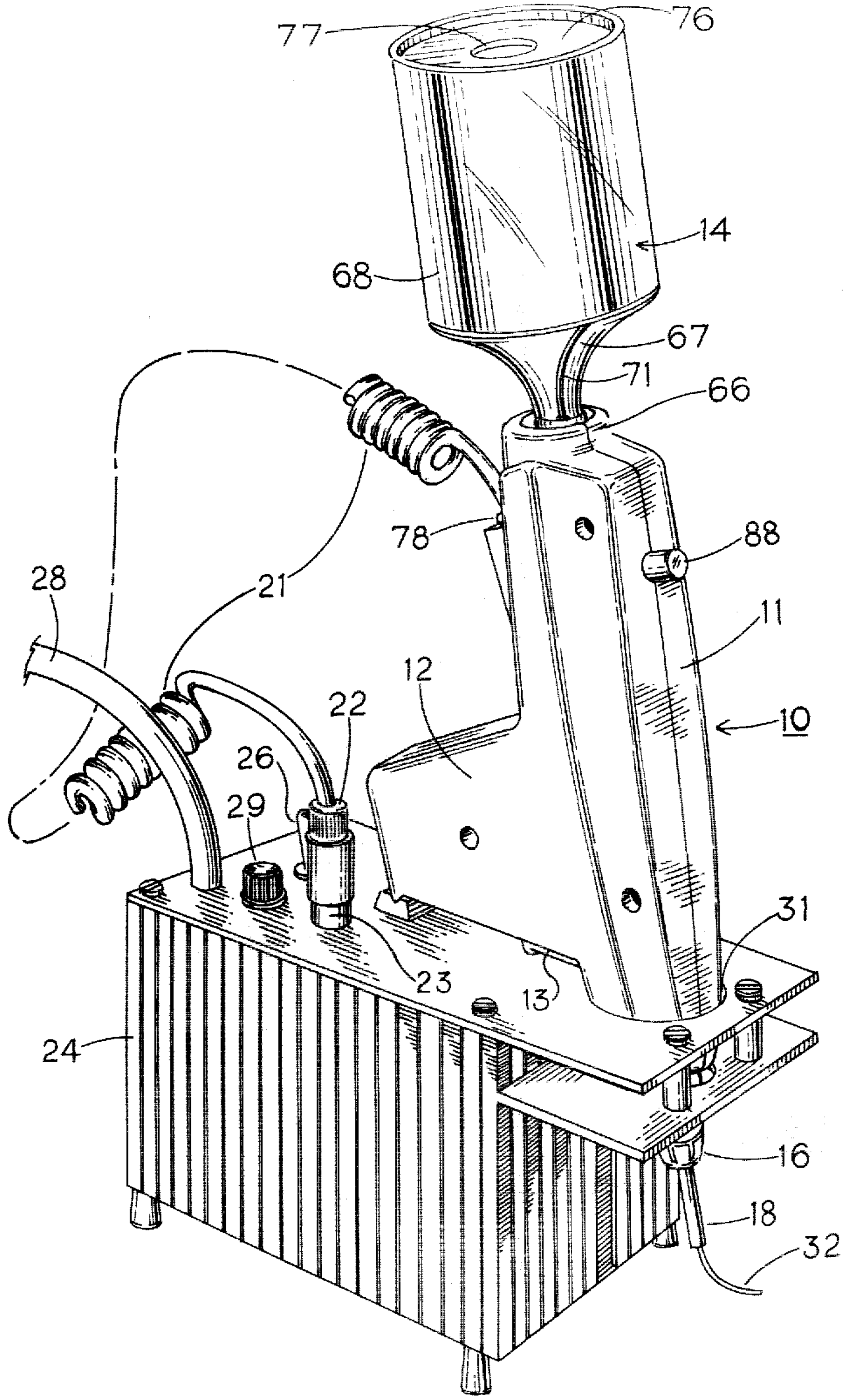
FIG. 1 is a perspective view of a lightweight portable wire storage and wrapping tool of the present invention resting in its power supply support stand at the work station of a wire wrapping operator.
Figures 2, 3, 8:
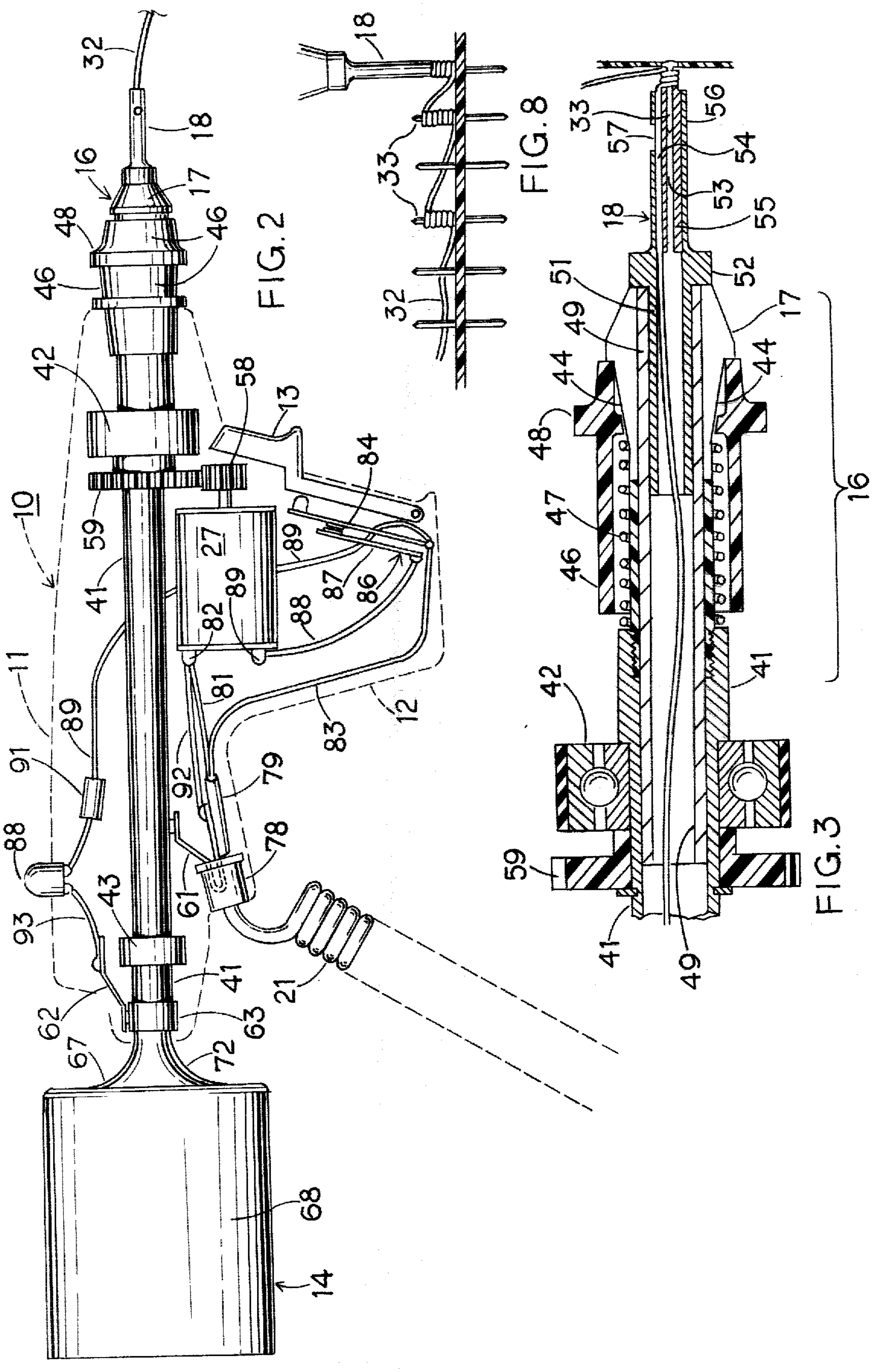
FIG. 2 is a cut-away diagrammatic side view of the portable wire storage and wrapping tool of the present invention illustrating its moving parts and electrical connections.
FIG. 3 is an enlarged cross-sectional side elevation view of the resilient spring collet used to secure the wrapping bit in the portable tool.
FIG. 8 is a fragmentary side elevation view, partially in section, showing the wrapping bit installing a series of wrapped connections on the winding posts of a circuit board.

As indicated in FIGS. 1 and 2, the portable wire storage and wrapping tool of the present invention is a small, compact unit weighing only a few ounces and provided with a convenient pistol grip and actuating trigger. As there shown, the tool generally indicated at 10 incorporates a barrel 11 enclosing the rotating parts of the device and surmounting a pistol-grip 12 enclosing a forwardly protruding trigger 13.

A lightweight wire storage container 14 is rotatably mounted at the rear end of the barrel 11, and a resilient spring collet 16, shown in detail in the enlarged cross-sectional view of FIG. 3, protrudes forwardly from the forward end of barrel 11, firmly securing within its split jaws 17 a small elongated tubular wrapping bit 18.

A continuity test lamp 88 surmounts the upper rear portion of barrel 11, and a power cord 21, preferably a coiled cord, extends from the rear underside of barrel 11 to a plug 22 inserted in a socket 23 mounted on a power supply housing 24 provided with a three-way switch 26 having positions corresponding to FORWARD, OFF and REVERSE connections for a drive motor 27 mounted inside the barrel and pistol-grip housing of the tool 10.

The motor 27 is preferably a 12-volt DC motor. The power supply housing 24 preferably encloses a DC power supply designed to receive A.C. line power entering the power supply 24 through a power cable 28 from a standard electrical power receptacle connection to line power, and converting the line power to 12-volt DC power delivered through power cord 21 to tool 10. One or more "POWER-ON" lamps 29 are preferably mounted near switch 26 to provide a convenient indication that the unit is connected to line power and ready for operation.

The forward end of the power supply housing 24 is provided with a tool socket 31, accomodating the forward end of the tool 10, permitting the tool to stand in ready condition atop power supply 24, with the lower end of pistol-grip 12 resting on the upper face of the power supply housing, and with the wrapping bit 18 extending into socket 31.

FORMING WRAPPED CONNECTIONS

As indicated in FIGS. 8 and 9, the insulated wire 32 led forwardly out through the wrapping bit 18 is wrapped tightly around wrapping posts 33 by telescoping insertion of the central hollow bore of wrapping bit 18 downward over the wrapping post 33, and twirling actuation of the bit 18, either manually as described in U.S. Pat. No. 3,967,661, or automatically by actuation of the drive motor 27, drawing the insulated wire 32 out through an eccentric feed portal 34 shown in FIG. 7 while rotation of the bit 18 wraps the delivered insulated wire 32 tightly around the wrapping post 33. The delivery end of delivery portal 34 is provided with a radial knife-edge 36 forming a V-shaped slitting edge.

Radial inward tension on wire 32 issuing through portal 34, produced by the wrapping itself, draws the wire insulation forcefully down over the V-shaped knife edge 36, slitting the insulation as indicated at 37 in FIG. 9 along the portion of the wire's periphery closest to the wrapping post 33. Continuing rotation of the bit 18 through six or eight revolutions draws the wire 32 with the slit insulation tightly around the square wrapping post 33.

As indicated in FIG. 9, the central conductive metal wire 40 carrying the major part of the tension applied by the revolving bit 18 is exposed through the slit 37 formed by the V-shaped knife edge 36. Wrapping tension draws the metal wire 40 closely around the square cross-section wrapping post 33, swaging the wire 40 into tight conductive engagement with the corners of the wrapping post 33 while forcing the softer insulation material aside to form an exterior enclosure around the entire wrapped connection and insulating it. An insulated, electrically conductive connection with the wrapping post 33 is thereby formed in a single operation requiring only seconds to complete.

ROTATING PARTS OF THE WRAPPING TOOL

The central drive shaft of the tool 10 is a hollow sleeve shaft 41 with its forward end mounted in a sturdy ball or roller bearing 42 whose outer race is anchored in the barrel 11 of the tool 10. The rear end of sleeve shaft 41 is provided with a smaller bearing, which may be a sleeve bearing 43, whose outer race is also anchored in the rear end of barrel 11 of the tool 10. The forward bearing 42 is preferably larger and sturdier because the principal lateral load tending to bend sleeve shaft 41 is imposed when the wrapping bit 18 is telescopingly lowered over a protruding wrapping post 33 as indicated in FIG. 8, and non-alignment of the tool 10 with the wrapping post 33 may impose bending loads on the post 33 and also on the tool 10.

As suggested by FIG. 4, the assembly of shaft 41, bearings 42 and 43, and collet assembly 16 forms a unitary assembly which can be removed from between the two halves of the housing for tool 10. These are preferably formed as molded plastic or die cast metal mirror image halves of the housing of tool 10, with suitable internal ribs supporting the stationary internal components of the tool such as motor 27 and bearings 42 and 43. Sleeve shaft 41 is preferably formed of metal, and serves as a return current path for the continuity check circuit of the present invention, described below.

Spring collet 16 comprises a split collet jaw 17 having a threaded rear end engaged in a threaded portal in the forward end of sleeve shaft 41, as indicated in FIG. 3, and having rearwardly slanting cam surfaces 44 engaged with and encircled by a camming ring 46 normally urged forward by a sturdy resilient helical coil spring 47 compressed between an internal shoulder of ring 46 and the forward end of sleeve shaft 41, all as shown in FIG. 3. Rearward force applied by the operator upon an outwardly protruding flange 48 of ring 46 compresses spring 47 and depresses ring 46 rearwardly away from cam surfaces 44, allowing resilient spring jaws 17 to separate. A removable collet tube 49 cooperating with jaws 17 is thereby released as the jaws resiliently separate. Mounted in the forward end of collet tube 49 is the tubular rear end 51 of wrapping bit 18, dimensioned for tight sliding insertion inside the forward end of collet tube 49 until a mid shoulder 52 of bit 18 reaches abutting engagement with the forward end of tube 49 as indicated in FIG. 3.

The forward end of wrapping bit 18 is provided with two axial thru apertures as shown in the enlarged views of FIGS. 6 and 7. The first is a central bore 53 dimensioned to receive in telescoping engagement, and to revolve about, each protruding wrapping post 33. The second axial aperture in the forward end of wrapping bit 18 is an eccentric channel positioned between bore 53 and the external surface of wrapping bit 18, and is preferably formed as a longitudinal groove 54 extending along the length of a central core portion 55 of bit 18, and opening at the forward end of bit 18 in the wire delivery portal 34, with the groove 54 being enclosed inside an external tubular wall 56 shown in FIG. 7 and indicated in dash lines surrounding the core 55, as shown in FIG. 6. The outer tubular wall 56 thus covers and encloses groove 54 to provide an eccentric wire delivery passage down the length of the core 55, which preferably extends from the forward delivery end of bit 18 toward mid shoulder 52, as indicated in FIG. 3. A lateral access aperture 57 formed in tubular wall 56 overlies a portion of the groove 54, permitting a sharp pointed object such as a pin to be inserted through the aperture 57 to maneuver the winding wire forwardly along groove 54 and out the portal 34, if the wire should inadvertently break off at portal 34.

ROTATION DRIVE SYSTEM

The tool 10 is provided with a small powerful DC motor 27 anchored within the barrel 11 and pistol grip 12 of the tool 10. Motor 27 has a drive pinion 58 delivering output torque via toothed engagement with a drive gear 59 keyed on sleeve shaft 41 close behind forward bearing 42. Actuation of motor 27 turning pinion 58 drives the gear 59 revolving sleeve shaft 41, turning collet 16, collet tube 49 and winding bit 18 as well as the wire storage container 14 frictionally held in tight sliding telescoped engagement with the rear end of sleeve shaft 41, as indicated in FIGS. 2 and 5.

A pair of electrically conductive wipers are mounted in the rear end of barrel 11, as shown in FIG. 2. Forwardmost wiper 61 is preferably mounted in the lower portion of barrel 11 in resilient contact with the outer peripheral surface of sleeve shaft 41. The rearmost wiper 62 is mounted near the rear end of barrel 11 extending just beyond the rear end of the rotatably mounted sleeve shaft 41 for engagement with a slip ring 63 mounted on the forward end of wire storage container 14, just behind its forwardly protruding sleeve flange 64 forming a wire dispensing portal and adapted for tight sliding telescoping engagement inside the open rear end of sleeve shaft 41, as indicated in FIGS. 4 and 5. The juxtaposed alignment of slip ring 63 with rearmost wiper 62 in the installed position of wire storage container 14 in sleeve shaft 41 is illustrated in FIG. 2.

A rearwardly extending cowling 66 preferably protrudes from the rear end of barrel 11 to encircle and protect the wiper 62.

WIRE STORAGE CONTAINER

The wire storage container 14 is formed with a widening bell-shaped funnel region 67 just behind slip ring 63 which opens out into the full diameter of the drum shaped container 14. A cylindrical sidewall 68 extends rearwardly to form a rearwardly facing concave storage cavity 69.

A spool 74 of connection wire is formed from a wire length of some 600 feet for example, of 28 gauge, 30 gauge, or 32 gauge wire wound on a removable mandrel in reversely helically coiled layers which are smoothly laid on the mandrel to form uniform wire layers one wire thick. A wire winding device similar to a fishing reel with a reciprocating indexing wire guide sweeping successively from left to right and right to left to lay each successive layer of wire into position on the removable mandrel is preferably employed to wind these tight successive uniform wire layers to form the equivalent of a ball of twine. As indicated in FIG. 5, the outermost end 72 of this storage spool of wire is led forwardly through a small hole 71 in the forward facing periphery of the bell-shaped funnel surface 67, and extends along that surface forwardly until its free end is brought into juxtaposition with slip ring 63, to which it is electrically connected, preferably by a solder connection. This free end 72 of the stored winding wire thus forms the final portion of the wire which will be withdrawn last from the wire storage container 14. The innermost layer of this long continuous length 74 of coiled wire provides the other end 73 thereof, and the remaining "ball of twine" coiled layers of wire 74 are held in position inside wire storage container 14 by a snap fit rear wall 76.

A central aperture 77 may be provided in rear wall 76 to afford probing access for guidance of the wire end 73 unreeled from the innermost layer of the wire coil 74 and the maneuvering of this interior free end 73 through the bell shaped funnel region 67 at the forward end of the wire storage container and out through the central bore of the sleevel flange 64, all as indicated in FIG. 5.

LOADING A FRESH WIRE STORAGE CONTAINER

The disassembly of the wire delivery components of the present invention for installation of a freshly loaded wire storage container 14 is schematically illustrated in FIG. 4, which may be compared to FIGS. 2 and 3. In view of the relatively small size of the internal end of groove 54 leading to the wire delivery portal 34, maneuvering of the free end 73 of wire into and through this groove 54 is difficult if wrapping bit 18 remains telescopingly inserted inside collet tube 49 and if both remain installed within the collet 16, making the interior end of groove 54 inaccessibly hidden deep down inside sleeve shaft 41 as indicated in FIG. 3.

Disassembly of the tool 10 is relatively simple, however, and requires only a few seconds. Flange 48 of collet camming ring 46 is drawn rearwardly by the user, unbiassing the split collet jaw 17 and allowing the wrapping bit 18, and its collet tube 49 telescoped thereon, to be withdrawn easily from inside the collet 16 and the sleeve shaft 41, as indicated in FIG. 4. Wrapping bit 18 may then be withdrawn endwise from the forward end of collet tube 49.

The free end 73 of wire unwound from the interior layer of the wire coil 74 inside wire storage container 14 is then maneuvered through the forward portal end of the container 14 defined by the forwardly projecting flange 64, and into the rearward end of the sleeve shaft 41 as indicated in FIGS. 4 and 5. The wire is easily maneuvered through the smooth tubular bore of sleeve shaft 41 and collet 16 and it is then drawn from the end of collet 16 at the position shown as 73A in FIG. 4 and inserted, as shown at 73B in FIG. 4 into the rearward end of collet tube 49.

Continuing threading insertion of the wire 73B leads its forward end to extend at 73C out the forward end of the collet tube 49 where it is free for threading insertion down the tubular rear end 51 of wrapping bit 18 and into the rear end of groove 54. The free end of the wire is thus telescopingly maneuvered through sleeve shaft 41, collet 16, collet tube 49 and groove 54 of wrapping bit 18 until it extends through delivery portal 34 to the position 32 shown in FIG. 4.

With the wire drawn through all of these associated tubular parts to this position 32, the parts may then be reassembled into their operating positions. Bit 18 is first inserted into collet tube 49, and collet 16 is then opened by withdrawing flange 48 rearwardly to unclamp split collet jaw 17, permitting the rear end of collet tube 49 to be inserted through the jaws 17 into the interior of sleeve shaft 41 until mid shoulder 52 is brought into flush abutting engagement with the forward end of the split jaws 17, as shown in FIG. 2 and FIG. 3.

The forwardly projecting cylindrical flange 64 on wire storage container 14 can be inserted inside cowling 66 into the rear end of sleeve shaft 41, as indicaed in FIGS. 4 and 5, to the installed position shown in FIG. 2, where slip ring 63 is engaged in electrical conductive contact with rear wiper 62. Forward wiper 61 has remained in contact with the external surface of conductive metal sleeve shaft 41. If the sleeve shaft 41 and its bearings and collet are removed from the internal mounting webs of the barrel 11, sleeve shaft 41 may be reinstalled easily with forward slip ring 61 in contact with its outer peripheral surface.

ELECTRICAL CIRCUITRY

Two parallel electrical circuits are powered by the pair of conductors introduced into the rear end of barrel 11 via the coiled power cord 21 connecting the tool 10 to its power supply housing 24. As shown in FIG. 2, the power cord passes through a bushing 78, avoiding flexing stress concentrations at the point where the power cord 21 passes into the housing of tool 10, and the interior end 79 of power cord 21 comprises two power-carrying conductors.

Conductor 81 is connected directly to terminal 82 of motor 27. Connector 83 is connected to one arm 84 of an ON/OFF switch 86. Arm 84 is actuated by trigger 13 to move it rearwardly into conductive engagement with arm 87 of switch 86, which is connected by conductor 88 to the second terminal 89 of motor 27, closing the circuit to deliver 12-volt DC power to motor 27. When the operator depresses trigger 13, actuating switch 86, DC power delivered by power cord 21 operates motor 27 turning gear 59 and twirling the wrapping bit 18 in a direction determined by the position of the FORWARD, OFF or REVERSE switch 26 on power supply 24, and thus winding the desired number of turns of the wire 32 onto wrapping post 33 in the manner illustrated in FIG. 8.

CONTINUITY CHECK CIRCUIT

As shown in FIG. 2, the two conductors 81 and 83 delivering DC power to the interior of tool 10 are also connected in parallel across a continuity indicator lamp 88 preferably mounted on an upper surface of tool 10. These connections are completed by a conductor 89 connected from conductor 83 in series through a resistor 91 to one terminal of the lamp 88, and another conductor 92 connecting conductor 81 to forward wiper 61, which may if desired be mounted on the bushing 78, as illustrated in FIG. 2. The third conductor 93 connects the other terminal of lamp 88 to the rear wiper 62 engaging slip ring 63 on wire storage container 14.

Slip ring 63 is insulated from sleeve shaft 41 by a portion of the non-conductive material of wire storage container 14 as illustrated in FIGS. 2 and 5 leaving lamp 88 unlit until slip ring 63 is otherwise connected to forward wiper 61 and sleeve shaft 41 through another conductive path. This conductive path is provided only when a current-carrying wrapped-wire connection is applied by wrapping bit 18 directly to a wrapping post 33.

When this wrapped connection is being made, the insulation of wire 32 is slit over radial knife edge 36 to expose the interior metallic conductor 40 of wire 32 which is swaged around wrapping post 33 as illustrated in FIG. 9. Wrapping post 33 is also telescopingly inserted inside the central bore 53 of wrapping tip 18 as indicated in FIG. 8. Since the scored slit 37 produced by knife edge 36 exposes the central conductor 40 for swaging, wrapped connection with wrapping post 33, a conductive circuit is thereby produced connecting wiper 61, sleeve shaft 41, collet tube 49, wrapping bit 18, wrapping post 33 and conductor 40 of wire 32 exposed through slip 37 and connected to wrapping post 33 engaging the bore 53 of wrapping bit 18. Conductor 40 is a continuous metalic conductor extending rearwardly through the telescoped parts 18, 49 and 41 through the flange portal 64 of wire storage container 14 and back up to the free wire end 73 and the coiled wire 74 stored in the container 14, leading finally to the opposite free end 72 of this coiled wire 74 which extends forwardly through opening 71 in container 14 and is soldered in electrically conductive engagement with slip ring 63, which contacts rear wiper 62.

Thus when wrapping bit 18 is in telescoping engagement with wrapping post 33 and has completed its rotation and thereby wrapped an electrically conductive connection of wire 32 on wrapping post 33, by this very act the tool 10 has completed the conductive circuit through the free end 73 of the wire 32, through the entire body of coiled wire 74 in container 14, and back through slip ring 63. This connects the two wipers 61 and 62 and provides a closed circuit energizing lamp 88, with current limited only by the resistor 91 in conductor 89, and by the internal resistance of the entire body of wire stored in container 14.

By this means, the operator can see immediately upon completion of the wrapped connection whether it is an electrically conductive, current-carrying connection. This continuity check indication applies to the specific wrapping post 33 on which the wire 32 is then being wrapped, since the engagement of that wrapping post 33 inside bore 53 of core 55 in wrapping bit 18 is an essential connection in the circuit energizing lamp 88.

The storage of the large coil of wire 74 inside cylindrical tubular container 14, and the unreeling of this wire from the interior of the coil 74 essentially in the same manner that twine is withdrawn from the interior of a ball of twine, as shown in Wooster U.S. Pat. No. 302,461, assures the static balance as well as dynamically balanced revolving motion of container 14 with sleeve shaft 41 and wrapping bit 18 whenever motor 27 is energized. Being tightly wrapped in its coiled position inside the periphery of wire storage container 14, the superimposed wire layers are not displaced by centrifugal force as wire container 14 revolves, and they stay in statically and dynamically balanced, stable condition inside container 14 at all times. Removal of successive turns 73 of wire from the innermost layer of the wire coil 74 does not disturb the static and dynamic balancing of container 14.

The operator is thus enabled to wrap many hundreds and even thousands of wrapped wire connections on wrapping posts 33 from a single wire storage container 14. When this is finally used up, a new storage container may be quickly and easily inserted and threaded in the manner described above. The present invention thus provides a striking improvement over conventional wire wrapping tools, both manually revolved and automatically motor driven wrapping tools.

Wrapping wire 73 delivered through wrapping bit 18 as wire 32 acquires no residual twist as it is wrapped on wrapping post 33, because the entire aligned rotating assembly 14-41-16-18 extending across FIG. 2 revolves together as a single unit, and every turn of wire 32 wrapped around post 33, produced by rotation of wrapping bit 18 driving delivery portal 34 around axial post portal 53 in a single revolution, produces a corresponding single revolution of wire container 14. If a wrapped connection requires six turns of wire 32, this is produced by six revolutions of the entire rotating assembly, and thus no twist accumulates in wire 73 as wrapping proceeds. Accordingly, there is no need to incorporate any pre-twist in the wire being laid up around the mandrel to form the spool 74 stored in storage container 14.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A wire storage and wrapping tool for making wrapped wire connections on wrapping posts comprising:

a portable housing having a front end and a rear end, a hollow open-ended sleeve shaft extending through the housing and rotatably mounted therein with its open ends exposed, a drive motor mounted in the housing and connected to rotate the sleeve shaft, a hollow wrapping bit removably engaged in the front end of the sleeve shaft and having means forming a wrapping post-engaging axial bore and an eccentric axial wire-delivery portal with an insulation-slitting axial edge, and a hollow wire storage container enclosing an extended length of wire wound in a succession of uniform layers concentric about a central axis, and having a wire exit portal disengageably secured to the rear open end of the sleeve shaft, with the storage container's exit portal, the hollow sleeve shaft and the wire delivery portal of the hollow wrapping bit forming a continuous wire-conveying passage through the tool, and with rotation of the sleeve shaft rotating the storage container and the wrapping bit together as an integral assembly, wherein the sleeve shaft carries associated wrapping bit-holding parts, and these parts and the sleeve shaft are made of electrically-conductive materials so that when the tool forms an electrically-conductive wire-wrapped connection to a wrapping post telescoped within the post-engaging axial bore of the wrapping bit, electrical continuity is achieved through the wrapping wire and wrapping post to the sleeve shaft, the tool further comprising:

a first wiper electrically contacting the sleeve shaft;

an electrical conductive slip ring insulatively connected to the sleeve shaft and electrically terminating the other, non-wrapped, end of the wire stored in the storage container;

a second wiper for electrically contacting the slip ring;

an indicator electrically connected at one end to the second wiper;

means for connection to a source of electrical power having a first end electrically connected to the indicator and a second end electrically connected to the first wiper;

whereby electrical continuity is obtained between the two ends of the electrical power source connection means when an electrically-conductive wire-wrapped connection is made by the tool to a wrapping post inserted in the wrapping bit's axial bore, thereby connecting the source of electrical power to energize the indicator under such circumstances and thereby inform the operator that a proper electrically-conductive wire-wrapped connection has been made to the wrapping post.

2. The tool defined in claim 1, wherein the indicator is a lamp.

3. The tool defined in claim 1, wherein the drive motor and the indicator are connected via parallel circuits across the two terminals of the power source.

4. The tool defined in claim 1, further including a rearwardly protruding cowling protecting the rearwardly extending second wiper from damage.

5. A wire storage and wrapping tool for making wrapped wire connections on wrapping posts comprising:

a portable housing having a front end and a rear end, a hollow open-ended sleeve shaft extending through the housing and rotatably mounted therein with its open ends exposed, a drive motor mounted in the housing and connected to rotate the sleeve shaft, a hollow wrapping bit manually removably engaged in the front end of the sleeve shaft and having means forming a wrapping post-engaging axial bore and an eccentric axial wire-delivery portal with an insulation-slitting axial edge, and a hollow cylindrical wire storage container for enclosing an extended length of wire wound in a succession of uniform layers concentric about a central axis, and having a central wire exit portal manually disengageably secured to the rear open end of the sleeve shaft for retention thereon during normal wire-wrapping operation, with the storage container's central exit portal, the hollow sleeve shaft and the wire delivery portal of the hollow wrappinb bit forming a continuous wire-conveying passage through the tool, with the hollow cylindrical storage container having its center of gravity positioned substantially coinciding with the central axis, and its weight dynamically balanced for revolution about the central axis, and with rotation of the sleeve shaft rotating the storage container and the wrapping bit engaged thereon together as an integral assembly, whereby the hollow, cylindrical dynamically balanced storage container accommodates a long length of wire wound in successive uniform cylindrical layers maintaining dynamic balance of the wire-filled storage container during rotation thereof, and whereby a length of wire unwound from the innermost uniform layer inside the cylindrical storage container is guided through the sleeve shaft and the eccentric wire delivery portal past the insulation-slitting edge for wrapping connection on a wrapping post telescoped within the post-engaging axial bore of the wrapping bit.

6. The tool defined in claim 1 wherein the sleeve shaft's axis of rotation extends rearwardly through the wire exit portal into the wire storage container, and also extends forwardly through the post-engaging axial bore of the wrapping bit.

7. The tool defined in claim 2 wherein the wire storage container is shaped as a solid of revolution whose axis substantially coincides with the sleeve shaft's axis of rotation.

8. The tool defined in claim 1 further including a spring collet mounted at the forward end of the sleeve shaft and positioned to clamp the wrapping bit therein.

9. The tool defined in claim 1 wherein the portable housing is provided with a pistol grip having a forward facing depressible trigger switch connected to energize the drive motor.

10. The tool defined in claim 1 wherein the wire storage container is provided with a rear cover portion having a central maneuvering aperture through which a tool may be inserted to maneuver an innermost free end of wire unwound from the innermost wire layer out through the wire exit portal.

11. The tool defined in claim 1, further including a continuity check system incorporating means for indicating the presence of electrical power having two points for making electrical contact, the indicating means electrically connected at one point to one stored end of the wire; and meand for connection to a source of electrical power connected at one end to the other point of the indicating means and at another end to the wrapping bit so that electrical contact is made from the other wrapping end of the wire wrapped about the wrapping post and thereby forming a continuous conductive path through the wire to the indicating means so as to energize the indicating means from the power source only when an electrically-conductive wire-wrapped connection is made to a wrapping post by the tool.

* * * * *